May 11, 1965 W. LÖDIGE ETAL 3,182,633
METHOD AND APPARATUS FOR ENVELOPING GRANULAR AND/OR SHORT FIBRED
SUBSTANCES IN COATINGS OF OTHER SUBSTANCES, PREFERABLY IN THIN
FILMS OF SYNTHETIC PLASTIC SUBSTANCES
Filed May 3, 1962 2 Sheets-Sheet 2

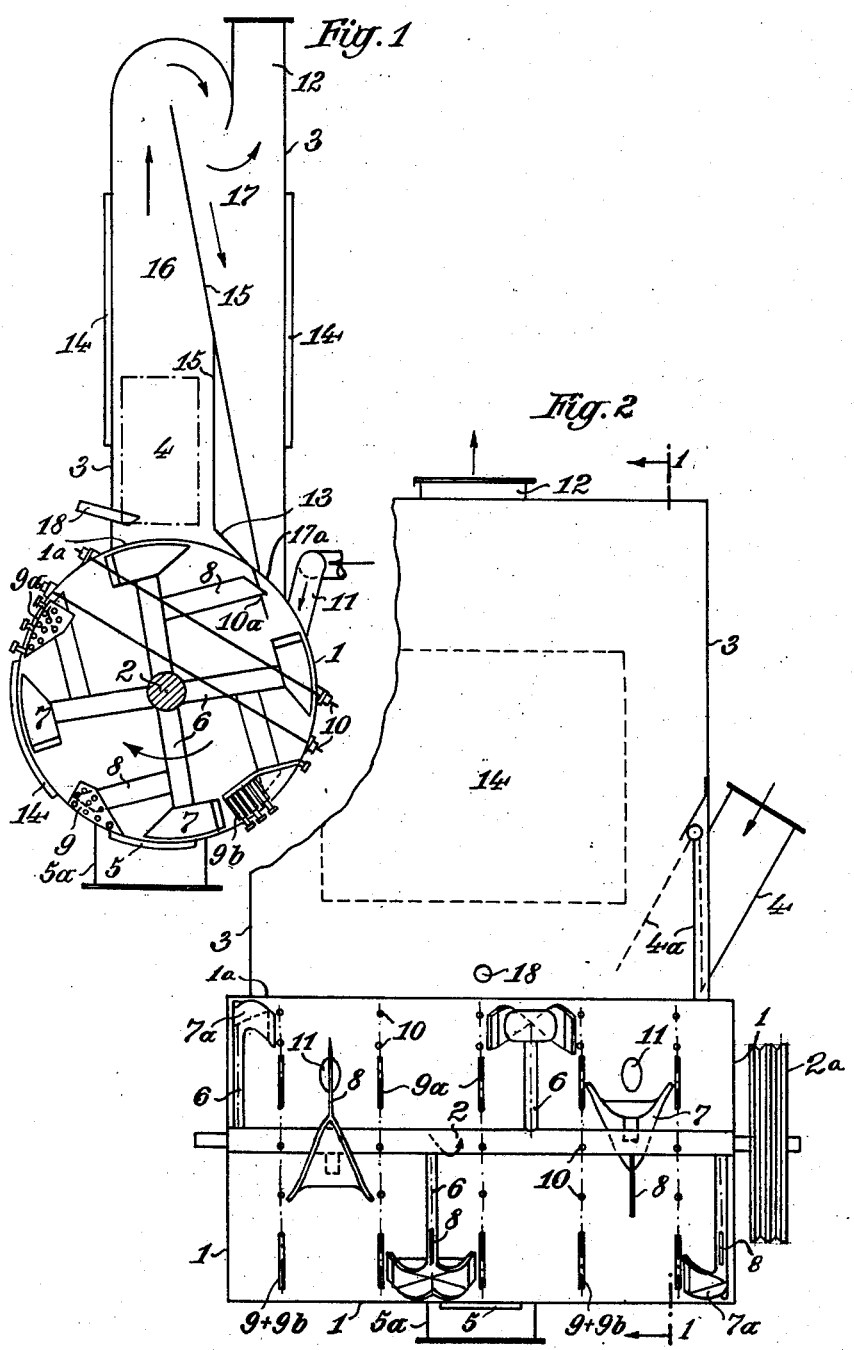

INVENTORS
WILHELM LODIGE
BY FRITZ LODIGE
JOSEF LUCKE

Tilman A. Nelson ATTY 3,182,633
METHOD AND APPARATUS FOR ENVELOPING GRANULAR AND/OR SHORT FIBRED SUBSTANCES IN COATINGS OF OTHER SUBSTANCES, PREFERABLY IN THIN FILMS OF SYNTHETIC PLASTIC SUBSTANCES
Wilhelm Lödige, Elsener Strasse 9c; Fritz Lödige, Elsener Strasse 9b; and Josef Lücke, Im Lohfeld 13; all of Paderborn, Germany
Filed May 3, 1962, Ser. No. 193,072
Claims priority, application Germany, May 16, 1961,
L 38,986/61
10 Claims. (Cl. 118—417)

This invention relates to a method and apparatus for enveloping granular and/or short-fibred substances in coatings of other substances, preferably in thin films of synthetic plastic substances. In certain branches of industry it is necessary to provide granular substances with coatings of other substances, particularly with thin films of synthetic plastic substances, For example, in the foundry art and in the abrasives industry, sands are needed which are enveloped in thin films of resin or synthetic plastic materials as binding agents but which still retain their granular structure.

In order to achieve this, in the first stage of a process, the granular substances are coated on their surface with solutions of the coating substance. In this case, either of solutions of the ready pre-formed coating substances are used, from which the films are produced by evaporation of the solvent, or solutions of intermediate products are used which are converted into the coating substances as a result of a further chemical reaction. Solutions of the last-mentioned type are used, in particular, when the films are to be formed from synthetic plastic substances. In this case, solutions of intermediate products are often used which are converted into higher polymerizates or condensates by means of a chemical reaction using hardeners, catalysts etc. The chemical reaction may take place before, simultaneously with or following the removal of the solvent. In this case the so-called solvent-free varnishes, which may be solutions of polyester resins, for example, in monomer vinyl compounds, may be used as initial solutions.

As already mentioned, the first phase of the complete process, that is to say the moistening of the granular substances with the solutions of the coating substances, generally does not involve any difficulties. On the removal of the solvent and/or the carrying out of the chemical reaction, the required hard coating films only appear after some time. Meanwhile, strongly adhesive, viscous coatings are formed which cause the basic material in the mixing apparatus consisting of individual grains to stick together and to be converted into a pulp-like, doughy mass. This phase of the process is difficult to carry out and encounters also great difficulties with respect to the apparatus.

It is, therefore, an object of the present invention to provide a process in which with particular reference to the said difficult intermediate phase, the difficulties of the intermediate phase are overcome and a fluid product is obtained as an end product, said product having the original granular structure and in which the individual grains are covered with dry, solid coatings of synthetic plastic substances, for example.

It is another object of the present invention to provide apparatus for carrying out this process and wherein the difficulties encountered in known apparatus for this purpose are overcome.

Still other objects of the present invention and advantages thereof will become apparent as the description proceeds.

According to the process aspect of the invention there is provided a method of enveloping the particles of granular and/or fibrous substances in coatings of other substances by impregnating the granular and/or fibrous substances with solutions of the coating substances or of intermediate products suitable therefor which are converted into the coating substances by chemical reaction during the process, removing the solvent and/or carrying out the chemical reaction of the intermediate products while maintaining or restoring the structure of the basic material, the granular and/or fibrous substances being coated during a slinging and/or whirling process by means of a suitable slinger apparatus in a mixing drum filled to about 30 to 70% of its capacity with the raw materials, the solutions of the coating substances or the intermediate products used therefor being introduced into the mixing drum during the slinging and whirling process, the slinging and whirling process being continued until the solution has become uniformly distributed over the surface of the granular and/or fibrous substance, after which the removal of the solvent and/or the carrying out of the chemical reaction is performed and the material being mixed, which tends to be transformed into a doughy state during this stage of the process, is subjected to the simultaneous action of a plurality of cutting members, friction members and deflecting members by means of which the material is diverted from the wall of the drum into the interior of the mixing drum, and continuously cut up and subjected to friction until the removal of the solvent and/or the carrying out of the chemical reaction has been performed and the material has again reached the fluid state.

According to the apparatus aspect of the invention there is provided an apparatus for enveloping the particles of granular and/or fibrous substances with coatings of other substances, starting with solutions of coating substances, removing the solvent from the mixture and maintaining the structure of the granular or fibrous material, comprising, in combination, a mixing drum which is mounted horizontally or slightly inclined, at least one coaxially arranged rotatable shaft which runs through the mixing container, carrier arms which are arranged helically on the shaft and stand at right angles to the shaft, wedge-shaped or ploughshare-like mixing tool which are mounted on the ends of the carrier arms and extend close to the drum wall and which remove the material from the drum wall during the mixing operation and deflect it towards the shaft, friction members which are mounted parallel to the direction of movement of the mixing tools between each two mixing tools on the inner wall of the mixing drum and which cooperate with the lateral faces of the mixing tools, a drive means for the shaft which moves the mixing tools at a peripheral speed of about 2.5 to 6 metres per second, a feed aperture which is provided in the upper portion of the mixing drum, means for feeding the solution of the coating substances into the mixing drum, and a closable discharge aperture which is provided in the lower portion of the mixing drum, at least one air-injection aperture which is mounted above the shaft at the side of the mixing drum at which the mixing tools travel downwards, a ventilating shaft which is mounted above the upper portion of the mixing drum and is in connection therewith, knife-like cutting members which run in the direction of movement of the carrier arms and are mounted on the carrier arms close to the mixing tools and between the same and the shaft, and dividing and deflecting rods which are mounted below the ventilating shaft between each two mixing tools and which divide up the material during its movement, remove it from the drum wall and deflect it towards the shaft.

One or two shafts carrying the mixing elements may be arranged, the two shafts being arranged parallel to each other. The mixing members are so shaped and arranged that on rotation they remove some of the material being mixed from the drum wall, that is to say they slide with their surface directed towards the shaft under the mixing material and sling some of the material being mixed out of the surface layer of material laterally into the free space in the machine and towards the shaft on leaving the material to be mixed. The mixing and slinging members are preferably wedge-shaped or shaped like ploughshares. In the latter case, the lateral surfaces of the mixing members may be convexly or concavely curved.

Friction members or specially shaped segments of steel bar with friction surfaces are mounted on the inner wall of the mixing container at right angles to the shaft of the slinging mechanism and are limited in their width and length in such a manner that they only take up a portion of the cross section of the mixing container. The lateral faces of the mixing and slinging members are so formed, particularly at their rear end, that they have substantially the same width as the friction members and they are set in such a manner that they brush past the friction surfaces at an acute angle with only a small spacing. The distance between the lateral faces of the slinging members and the friction members should be sufficiently great so that the mixing operation does not lead to a destruction of the structure of the material being mixed, for example, of the grain size of the sand used. The distance should amount to at least 1.5 times the coarsest grain contained in the material being mixed. In many cases, a greater distance is advisable.

If a material is being used which tends to adhere and the friction members are secured to the drum wall without interruptions, this encourages the clinging of adhesive materials, particularly in the corners between the drum wall and the lateral faces of the friction members. The clinging of adhesive materials can be avoided if the friction members are mounted on rods at some distance from the drum wall so that the material pressed into the corners by the mixing members can escape to the other side of the friction member. For the same reasons, segments of steel bar with friction surfaces are to be recommended for certain materials being mixed. The friction members or segments with friction surfaces are substantially wedge shaped when seen from the side and are arranged in such a manner that doughy material tending to form eddies is forced away from the drum wall into the interior of the mixer against the direction of centrifugal force, in conjunction with the rotating mixing members.

In order to divide the granular, pulpy, doughy material continuously before and during the evaporation of the volatile components and in order to prevent the material, which has been agglomerated as a result of the moisture, from forming a vortex of material, the mixer is additionally equipped, according to the invention, with cutting and dividing devices which are arranged in such a manner that they intermittently divide the viscous doughy material and convey it counter to the direction of centrifugal force, away from the drum wall toward the shaft. For this purpose, dividing and deflecting rods are mounted above the shaft between the mixing members so that they run through the upper mixing chamber. These rods may be secured by one end to the drum wall and project with the other end into the mixing chamber. The rods may conveniently be interchangeably secured by both ends to opposite points in the drum wall because their loading is considerable during the mixing operation. In adidtion, knife-like cutting members which run in the direction of movement of the carrier arms and which likewise repeatedly divide the material, are mounted on the carrier arms close to the mixing members. As a result of the stationary installation of the dividing and deflecting rods and of the friction members or segments with friction surfaces and as a result of the co-rotating cutting members mounted in front of the mixing tools, relative movements occur between the material being processed and these members. As a result of the shearing division of the agglomerations of material at every point in the mixer, even viscous doughy material remains capable of being slung about.

The apparatus according to the invention is illustrated in four figures in the accompanying drawing in which:

FIG. 1 shows a cross-section on the line A—B of FIGURE 2.

FIG. 2 shows a longitudinal section through the drum of the machine.

FIG. 3 is a detailed view, with parts in section, of the friction element 9a.

Figure 3:
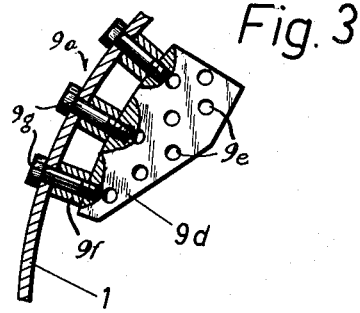
Figure 4:
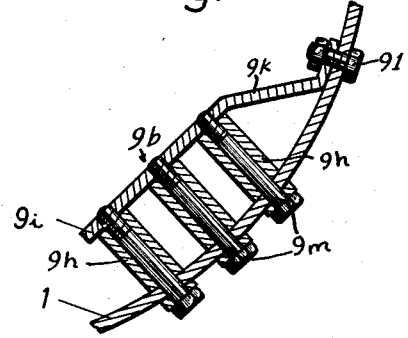
FIG. 4 is a central sectional view of the friction element 9b.

Referring to the drawings the machine comprises a shaft 2 with a V-belt pulley 2a, which shaft is driven in the direction of the arrow at a peripheral speed of 2.5 to 6 metres per second and runs parallel to the wall of a cylindrical mixing drum 1. Carrier arms 6, on the ends of which are mounted mixing members 7 which are preferably shaped like ploughshares and pass close to the drum wall on rotation, are mounted on the shaft 2 being staggered at its circumference and along its length. The central mixing members have a double-sided slinging action, while mixing members 7a having a one sided action are provided at the two ends of the mixing drum (only shown in FIG. 2). Knife-like cutting plates 8 are provided in front of the carrier arms 6. Interchangeable segments with friction surfaces are shown in three possible embodiments between each two mixing members at right angles to the shaft on the inner wall of the mixing drum. In FIG. 1 or 2, the friction plates which are mounted close to the drum wall are designated by 9, friction plates which are mounted at a distance on webs are designated by 9a and segments with friction surfaces which are made from steel bar are designated by 9b. The friction element 9a, shown in detail in FIG. 3, consists of a friction plate 9d having holes 9e which plate is mounted at a distance from the drum wall 1 by means of hollow rods 9f and screws 9g. The friction element 9b, shown in detail in FIG. 4, consists of hollow steel bars 9h and a linking and supporting bar 9i having an inclined front part 9k and being fixed to the drum wall 1 by a screw 9l. The steel bars 9h are attached between the drum wall 1 and the supporting bar 9i by means of screws 9m and are arranged in such a manner that a sufficiently large aperture remains between the steel bars near the drum wall to allow material being mixed to pass therethrough without destruction of the particles of the material being mixed.

At least one dividing and deflecting rod 10 and/or 10a is mounted, interchangeably between each two mixing members, above the shaft and below the feed and ventilating aperture 1a. A discharge trap 5 is provided at the bottom inside an outlet 5a. Air-injection pipes or inlets to the mixing containers are designated by 11 and are mounted above the shaft at the side at which the mixing members travel downwards during rotation. In order to avoid blockages, the injection apertures 11 should be provided at those points in the longitudinal direction of the drum 1 at which the tip of a mixing member 7 is rotating. Above a large feed and ventilating aperture 1a in the mixing container is a large ventilating shaft 3 for the drying process. The interior of this shaft is divided by means of an obliquely arranged partition wall 15 into two compartments 16 and 17. At the bottom, the partition wall 15 is constructed in such a manner that a baffle surface 13 is formed. In the wall of the ventilating shaft 3 (FIG. 2) is a feed inlet 4 for dry materials, the mouth of which is in the ventilating shaft and is closed by a pivoted flap 4a during the mixing operation. All liquid additives are fed in through an inlet 18 during the mixing, that is to say, during the slinging and eddying process.

Trap doors on the ventilating shaft and on the mixing container for cleaning and assembly are designated by 14.

Air injected into the mixing container can escape through an aperture 12.

The operation of the machine according to the invention will now be described in which the machine is used for the preparation of mould sand:

Sand, as well as hardeners, synthetic resin and any additives are fed into the mixer through the feed inlet 4. The drum is preferably filled a minimum of 30% and a maximum of 70% of its capacity. As a result of the fact that the mixing tools rotate quickly and the mixer works on the slinging and eddy process, a mixing time of 1 minute is sufficient for the preliminary dry mixing in order to obtain a homogeneous mixture. The solvent is then added through the pipe 18 or sprayed in with the slinging mechanism rotating. As a result of the slinging and eddying process, the solvent is mixed with the synthetic resin powder, dissolves it and envelops each grain of sand. As a result of the friction in the material being mixed, the material is heated by about 15 to 20 degrees within a few minutes. A large proportion of the solvent is already evaporated by this heating and the slinging about in the mixing chamber before additional cold or hot air is injected. Because the material being mixed has already been heated by friction, the solvent has volatilized to such an extent within about ½ a minute of the air injection, that a dough is formed which becomes more and more viscous and tends to form a vortex of material. If the mixer were not equipped with the dividing and deflecting rods 10 and 10a, the cutting plates 8, the friction plates 9, 9a, and 9b and the baffle plate 13, the mixing tools alone would no longer be able to divide the agglomerations of dough. A ring of material would form on the drum wall and would be pushed along ahead of the mixing blades. The doughy mass would rise in the ventilating shaft as a result of centrifugal force, would solidify there and constrict the air passage. With the arrangement according to the invention, the material does not form large agglomerations because the knives 8 repeatedly cut up the dough while the dividing rods 10 and 10a hold the dough and repeatedly urge it towards the shaft in the middle of the mixer as a result of the oblique arrangement of the dividing and deflecting rods in conjunction with the knives. The viscous dough, which in itself is urged towards the drum wall by centrifugal force, is repeatedly divided up and conveyed into the interior of the mixer as a result of the shape and arrangement of the friction plates or the segments with friction surfaces. This operation is aided by the obliquely arranged baffle surface 13. Thus the material remains capable of being slung about in the apparatus. After about half a minute, the drying process has progressed so far, with the cooperation of the frictional heat and of the air which is injected into the slung and eddied material, that the agglomerations disintegrate and the sand again becomes fluid. The small lumps which still remain in the material at the end of the drying are subjected to friction by the cooperation between the mixing blades and the friction plates or the segments with friction surfaces.

In order to separate any sand which may be flung upwards from the drying air, the mixer is provided with a large ventilation shaft 3. During the drying process, the material is continuously involved in a slinging and eddying process. Additional air is injected into the material which has been greatly loosened up by the slinging and eddying and this air is entrained by the mixing members through the lower region of the mixer, that is to say through the material being mixed, as a result of the vacuum behind the rotating mixing members, and is driven upwards with some of the material into the chamber 16. On impinging against the baffle surface 13 and the partition wall 15 the greater part of the material falls back into the mixing container while the air is conveyed in the direction of the arrow over the partition wall 15 into the compartment 17. As a result of the direction in which the air moves into the compartment 17, even the residual quantities of material are separated from the air and fall back into the mixing drum through aperture 17a in the compartment which becomes narrower at the bottom, while the air escapes through the vent 12 as a result of the excess pressure in the mixing container and the ventilating shaft. As a result of the fact that the compartment 16 has a greater width at the bottom and the compartment 17 has a greater width at the top, the separating process—air and material—is encouraged.

The advantages of the invention lie, inter alia, in more rapid mixing, greater accuracy in mixing and the resulting saving of synthetic resin and solvents. The supply of air is arranged in such a manner that the injected air is entrained at least once in the direction of rotation by the eddying material as a result of which a short drying time is obtained with the minimum expenditure of energy. The re-disintegration of the agglomerations of material into the original grain structure is effected during the actual drying process so that the material is only being processed for a short time. As a result, the grains are not damaged and the film of synthetic resin is not rubbed off again.

What we claim is:

1. An apparatus for enveloping the particles of granular materials and fibrous materials with coatings of other substances, starting with a solution of the coating substances, removing the solvent from the mixture, and maintaining the structure of the granular and fibrous materials, comprising, in combination, a mixing drum which is mounted substantially horizontally, at least one coaxially arranged rotatable shaft extending through said mixing drum, carrier arms arranged helically on said shaft and at right angles thereto, ploughshare-like mixing members which are mounted on the ends of said carrier arms and extend close to the drum wall, friction members which are mounted on the inner wall of said mixing drum parallel to the direction of movement of said mixing members between each two mixing members and which cooperate with the lateral faces of the mixing members, a drive means for said shaft which moves said mixing members at a peripheral speed of about 2.5 to 6 metres per second, a feed aperture in the upper portion of said mixing drum, means for feeding the solution of the coating substance into the mixing drum, and a closable discharge aperture in the lower portion of said mixing drum, at least one air-injection aperture which is mounted above said shaft at the side of said mixing drum past which aperture said mixing members travel downwards, a ventilating shaft on the upper part of said mixing drum connecting therewith, knife-like cutting members which run in the direction of movement of said carrier arms and which are mounted on said arms close to said mixing members and between the same and said shaft extending through the mixing drum, and dividing and deflecting rods which are mounted below said ventilating shaft between each two mixing members and which divide up the material being mixed during its movement, remove it from the drum wall and deflect it towards the shaft extending through the mixing drum.

2. An apparatus as claimed in claim 1, wherein the friction members are plate-like and are mounted perpendicularly to the drum wall.

3. An apparatus as claimed in claim 2, wherein the friction plates have a wedge-shaped form when seen from the side and wherein their tips are arranged close to the drum wall in opposition to the direction of rotation of the mixing members.

4. An apparatus as claimed in claim 2, wherein the friction plates are carried by rods and are arranged at a distance from the drum wall.

5. An apparatus as claimed in claim 1, wherein a partition wall is built into the ventilating shaft by means of which entrained particles of material are separated from the air escaping from the drum and returned to the mixing drum.

6. An apparatus as claimed in claim 5, wherein a baffle plate is mounted obliquely on the partition wall between the interior of the mixing drum and the ventilating shaft by means of which the material slung upwards is returned to the interior of the mixing drum.

7. An apparatus as claimed in claim 1, wherein the air inlets in the drum wall are arranged above the shaft tangentially at the side of the drum at which the rotating mixing members travel downwards.

8. An apparatus as claimed in claim 1, wherein the air inlets are arranged in the longitudinal direction of the drum in such a manner that the tip of a mixing member rotates in front of the injection aperture, in order to prevent blockage of the apertures by the material, and wherein the injected air is drawn downwards through the material below the shaft by the vacuum between the wider end of the rotating mixing member.

9. An apparatus as claimed in claim 1, wherein the friction members consist of steel bars which are arranged in such a manner that a sufficiently large aperture remains between the steel bars near the drum wall.

10. An apparatus for enveloping the particles of granular materials and fibrous materials with coatings of other substances, starting with a solution of the coating substance, removing the solvent from the mixture, and maintaining the structure of the granular and fibrous materials, comprising, in combination, a mixing drum which is mounted substantially horizontally, at least one coaxially arranged rotatable shaft extending through said mixing drum, carrier arms arranged helically on said shaft and at right angles thereto, wedge-shaped mixing members which are mounted on the ends of said carrier arms and extend close to the drum wall, friction members which are mounted on the inner wall of said mixing drum parallel to the direction of movement of said mixing members between each two mixing members and which cooperate with the lateral faces of the mixing members, a drive means for said shaft which moves said mixing members at a peripheral speed of about 2.5 to 6 metres per second, a feed aperture in the upper portion of said mixing drum, means for feeding the solution of the coating substance into the mixing drum, and a closable discharge aperture in the lower portion of said mixing drum, at least one air-injection aperture which is mounted above said shaft at the side of said mixing drum at which said mixing members travel downwards, a ventilating shaft on the upper part of said mixing drum connecting therewith, knife-like cutting members which run in the direction of movement of said carrier arms and which are mounted on said carrier arms close to said mixing members and between the same and said shaft extending through the mixing drum, and dividing and deflecting rods which are mounted below said ventilating shaft between each two mixing members and which divide up the material being mixed during its movement, remove it from the drum wall and deflect it towards the shaft extending through the mixing drum.

References Cited by the Examiner
UNITED STATES PATENTS

| | | | |
|---|---|---|---|
| 2,679,385 | 5/54 | Lodige et al. | 259—9 |
| 2,829,982 | 4/58 | Hoyt | 117—100 |
| 2,892,443 | 6/59 | Lodige et al. | 118—417 X |
| 3,011,876 | 12/61 | Raistrick | 259—9 |

RICHARD D. NEVIUS, *Primary Examiner.*

JOSEPH B. SPENCER, *Examiner.*